United States Patent
Hayashi et al.

(10) Patent No.: US 6,763,401 B2
(45) Date of Patent: Jul. 13, 2004

(54) DIRECT MEMORY ACCESS CONTROLLER

(75) Inventors: Yuusuke Hayashi, Kawasaki (JP); Masaaki Tani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/370,523

(22) Filed: Feb. 24, 2003

(65) Prior Publication Data

US 2003/0200362 A1 Oct. 23, 2003

(30) Foreign Application Priority Data

Apr. 22, 2002 (JP) .................................. 2002-119752

(51) Int. Cl.[7] .......................... G06F 13/20; G06F 13/28
(52) U.S. Cl. ........................ 710/22; 710/26; 710/33; 710/308; 711/100; 711/200; 711/201
(58) Field of Search ............................. 710/22, 26, 33, 710/308; 711/100, 200, 201

(56) References Cited

U.S. PATENT DOCUMENTS 5,628,026 A * 5/1997 Baron et al. ................ 710/1
5,737,638 A * 4/1998 Byrn et al. ................. 710/68
6,026,239 A * 2/2000 Patrick et al. .............. 717/154
6,684,267 B2 * 1/2004 Hiji .............................. 710/22

FOREIGN PATENT DOCUMENTS

JP 63-89984 4/1988
JP 6-332790 12/1994

* cited by examiner

Primary Examiner—Rehana Perveen
(74) Attorney, Agent, or Firm—Staas & Halsey LLP

(57) ABSTRACT

A transfer destination address generator includes an arithmetic device that calculates a difference between a transfer destination address and a transfer source address, a difference holding register that stores the difference, and an arithmetic device that calculates the transfer destination address based on the difference stored in the difference holding register, and on the transfer source address. A transfer source address generator includes a transfer source address register that stores a present value of the transfer source address, and a transfer source reload register that stores an initial value of the transfer source address.

12 Claims, 6 Drawing Sheets

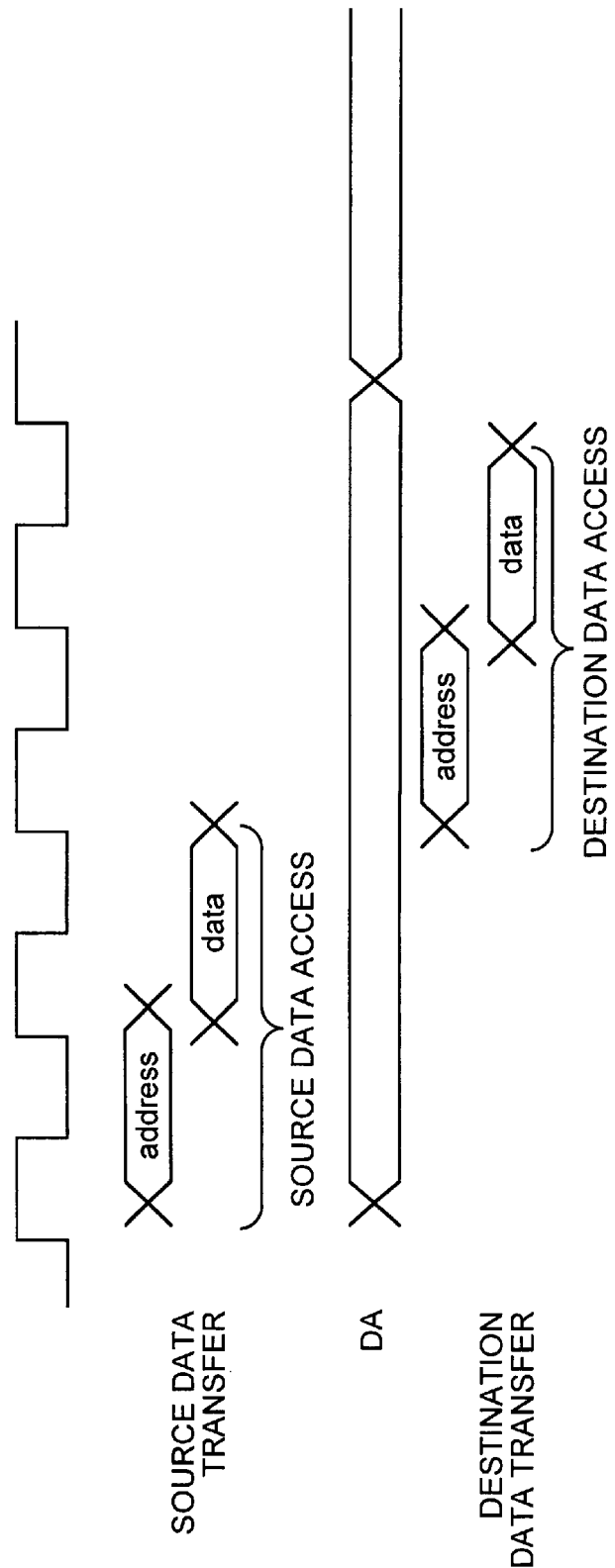

DIRECT MEMORY ACCESS CONTROLLER

CROSS-REFERENCE TO RELATED APPLICATIONS

This application is based upon and claims the benefit of priority from the prior Japanese Patent Application No.2002-119752, filed on Apr. 22, 2002, the entire contents of which are incorporated herein by reference.

BACKGROUND OF THE INVENTION

1) Field of the Invention

The present invention relates to a low power consumption type direct memory access (DMA) controller.

2) Description of the Related Art

A demand for low power consumption electrical equipments is rising. Accordingly, microcomputers used in the electrical equipments are desired to operate with low power consumption. On the other hand, performance of the electrical equipments is increasing day by day. It is, therefore, necessary to decrease the power consumption of the electrical equipments without deteriorating the performance, such as the data transfer performance, thereof.

In the field of computers, there is known a DMA transfer method in which data is directly transmitted and received between memories or between a memory and a peripheral device without using a CPU. This method allows speedy data transfer between the memories or between the memory and the peripheral device.

FIG. 1 is a diagram that shows the circuit configuration of a conventional DMA controller. In this DMA controller, if a transfer source address, a transfer destination address, and number of transfers (hereinafter "transfer number") are supplied from a data bus 1 to the conventional DMA controller by CPU write, the conventional DMA controller stores the transfer source address in a transfer source address register (SA) 21 and a transfer source reload register (SAR) 22 of a transfer source address generator 2.

The transfer destination address is stored in a transfer destination address register (DA) 31 and a transfer destination reload register (DAR) 32 of a transfer destination address generator 3. Further, the transfer number is stored in a transfer number register (TN) 41 and a transfer number reload register (TNR) 42 of a transfer number setting section 4. The reload function of the DMA controller is realized by storing the initial values in the respective reload registers in this manner.

If present values and initial values are written to the six registers 21, 22, 31, 32, 41 and 42, respectively and a start signal is received, first data transfer starts. The DMA controller outputs the transfer source address and the transfer destination address. By doing so, data stored in a region, which corresponds to the transfer source address, of the memory or the like of a transfer source is written to a region, which corresponds to the transfer destination address, of the memory or the like of a transfer destination.

If the first data transfer is finished, an arithmetic device 24 adds or subtracts a preset adjustment value 25 to or from the value stored in the transfer source address register 21. The value obtained as a result of this arithmetic operation is stored, as a new transfer source address, in the transfer source address register 21 through a selector 23.

Similar operation is performed with regard to the transfer destination address. Namely, if the first data transfer is finished, an arithmetic device 34 adds or subtracts a preset adjustment value 35 to or from the value stored in the transfer destination address register 31. The value obtained as a result of this arithmetic operation result is stored, as a new transfer destination address, in the transfer destination address register 31 through a selector 33. It is assumed here that the adjustment values 25 and 35 have same values.

With regard to the transfer number, if the first data transfer is finished, an arithmetic device 44 subtracts 1 from the value stored in the transfer number register 41. The value obtained as a result of this arithmetic operation is stored, as a new transfer number, in the transfer number register 41 through a selector 43.

Once new values are stored in the transfer source address register 21, the transfer destination address register 31, and the transfer number register 41, respectively, then the second data transfer starts. The data transfer is repeated until the value stored in the transfer number register 41 reaches a maximum number of transfers to be performed (hereinafter "transfer final value") (e.g., 1).

If the value stored in the transfer number register 41 becomes the transfer final value and the data transfer is finished, the initial values stored in the transfer source reload register 22, the transfer destination reload register 32, and the transfer number reload register 42, are written to the transfer source address register 21, the transfer destination address register 31, and the transfer number register 41, respectively. The data transfer is repeated in response to a signal that indicates transfer start, again by performing these operations, and is stopped in response to the generation of a stop signal. If the CPU refers to the present transfer source address, the present transfer destination address or the present transfer number, the value stored in the transfer source address register 21, the transfer destination address register 31, or in the transfer number register 41 is fed to the CPU through the data bus 1.

FIG. 2 shows the update timings of the transfer source address register 21 and the transfer destination address register 31, and the read and write timings of transfer data in the conventional DMA controller. As shown in FIG. 2, conventionally, the value stored in the transfer source address register 21 is updated right after transfer target data is read from the memory or the like that is the source of the transfer.

Meanwhile, there is proposed an address generation circuit for a DMA controller of an image editing apparatus. See, for example, Japanese Patent Application Laid-Open No. S63-89984. In this DMA controller a register that sets variations (offsets) of a transfer source address and of a transfer destination address is provided, these offsets are added or subtracted to and from the respective addresses of a transfer source, and the respective addresses of a transfer destination are thereby obtained.

According to the conventional DMA controller shown in FIG. 1, however, it is necessary to provide the transfer source address register 21 and the transfer source reload register 22 in the transfer source address generator 2, the transfer destination address register 31 and the transfer destination reload register 32 in the transfer destination address generator 3, and the transfer number register 41 and the transfer number reload register 42 in the transfer number generator 4.

As a result, flip-flops equal to two times the number obtained by multiplying the number of channels by the number of bits of the registers are required in the conventional DMA controller. This disadvantageously increases the power consumption and the circuit scale. Although it may be considered to, for example, decrease frequency so as to suppress the power consumption of the flip-flops, this disadvantageously results in the deterioration of the performance of the DMA controller.

The DMA controller disclosed in the Japanese Patent Application Laid-Open No. S63-89984 is intended to accelerate the data transfer and not to decrease the power consumption.

SUMMARY OF THE INVENTION

It is an object of this invention to provide a DMA controller that can decrease power consumption, make circuit scale small, and can be easily incorporated into an existing circuit without deteriorating the performance of the DMA controller.

The DMA controller according to one aspect of the present invention, in which an additive value or a subtractive value of a transfer destination address is equal to an additive value or a subtractive value of a transfer source address, includes a transfer source address storing unit that stores a present value of the transfer source address; a transfer source reload storing unit that stores an initial value of the transfer source address; a first difference calculating unit that obtains a difference between the initial value of the transfer source address and an initial value of the transfer destination address; a difference storing unit that stores the difference obtained by the first difference calculating unit; and a second difference calculating unit that calculates a present value of the transfer destination address based on the difference stored in the difference storing unit and the present value of the transfer source address stored in the transfer source address storing unit.

According to the above aspect, the difference holding unit is provided instead of the conventional transfer destination address register, and a transfer destination reload unit is provided in the transfer destination address generator. Therefore, the number of registers that hold the addresses decrease as compared with the conventional case. The number of flip-flops decreases by the number obtained by multiplying the number of channels by the number of bits of registers, accordingly.

The DMA controller according to another aspect of the present invention, in which an additive value or a subtractive value of a transfer destination address is equal to an additive value or a subtractive value of a transfer source address, includes a transfer destination address storing unit that stores a present value of the transfer destination address; a transfer destination reload storing unit that stores an initial value of the transfer destination address; a first difference calculating unit that obtains a difference between the initial value of the transfer destination address and an initial value of the transfer source address; a difference storing unit that stores the difference obtained by the first difference calculating unit; and a second difference calculating unit that calculates a present value of the transfer source address based on the difference stored in the difference storing unit and the present value of the transfer destination address stored in the transfer destination address storing unit.

According to the above aspect, the difference holding unit is provided instead of the conventional transfer source address register, and a transfer source reload register is provided. Therefore, the number of registers that hold addresses decrease when compared with the conventional case. The number of flip-flops decreases by the number obtained by multiplying the number of channels by the number of bits of registers, accordingly.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 6 is a timing chart that shows the operation timings of the DMA controller shown in FIG. 5.

DETAILED DESCRIPTIONS

Exemplary embodiments of the DMA controller according to the present invention will be explained in detail with reference to the accompanying drawings.

Figure 3:
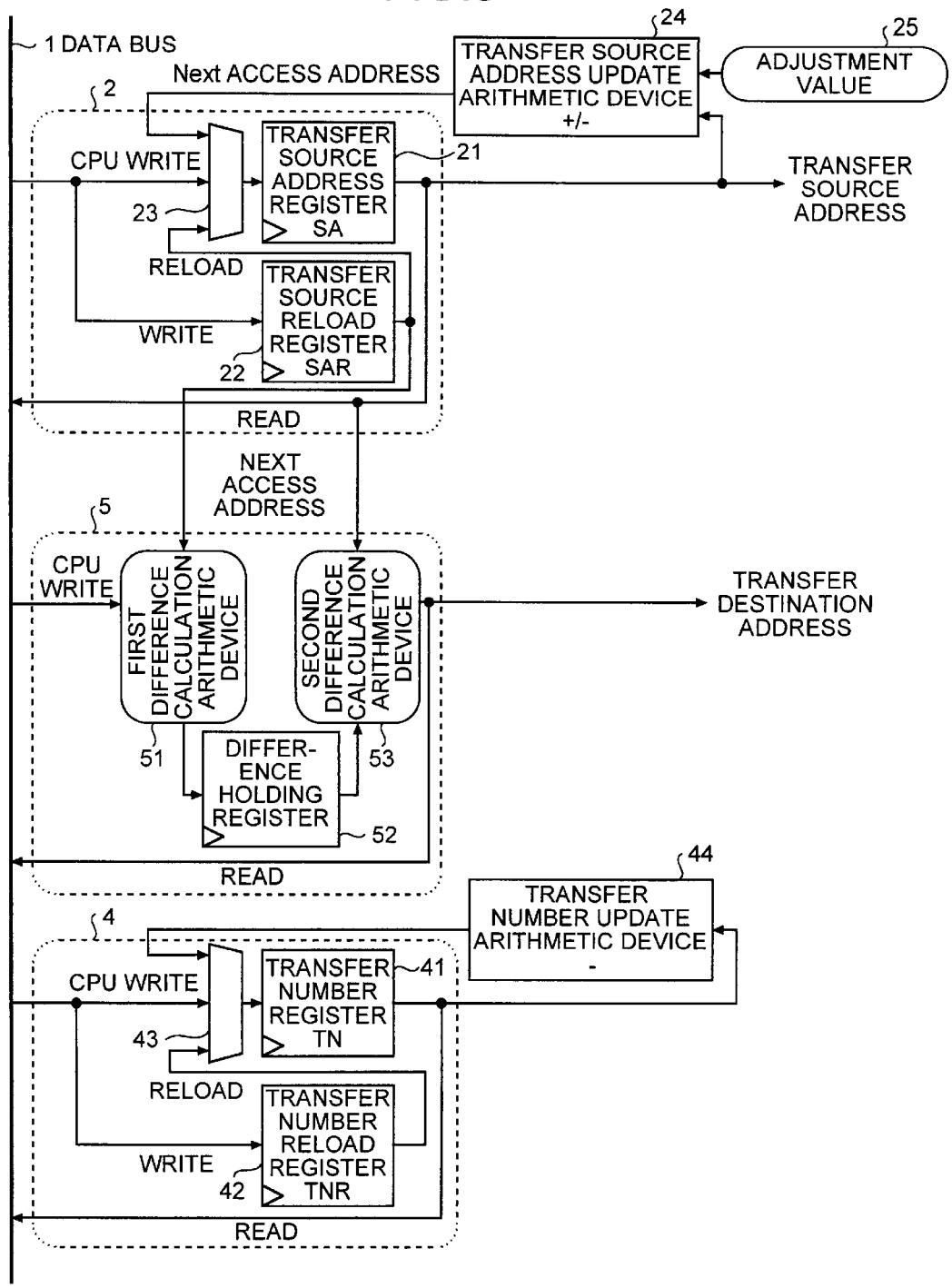
FIG. 3 is a diagram that shows the circuit configuration of a DMA controller according to the first embodiment of the present invention.

FIG. 3 is a diagram that shows the circuit configuration of a DMA controller according to the first embodiment of the present invention. This DMA controller has the transfer source address generator 2 that includes a transfer source address register (SA) 21, a transfer source reload register (SAR) 22, and a selector 23. The DMA controller has a transfer destination address generator 5 that includes a first difference calculation arithmetic device 51, a difference holding register 52, and a second difference calculation arithmetic device 53. The DMA controller has the transfer number setting section 4 that includes a transfer number register (TN) 41, a transfer number reload register (TNR) 42, and a selector 43. The DMA controller also has the transfer source address update arithmetic device 24 and the transfer number update arithmetic device 44.

The transfer source address register 21 stores the present value of a transfer source address. The present value of the transfer source address stored in the transfer source address register 21 is supplied, as a transfer source address, to the memory or the like as a transfer source. The transfer source reload register 22 stores the initial value of the transfer source address supplied from a data bus 1 by CPU write.

If the transfer source address is supplied as the initial value from the data bus 1 by CPU write, the selector 23 selects the transfer source address supplied by the CPU write. If data transfer is finished by the number of times designated by the transfer number register 41, the selector 23 selects the initial value of the transfer source address stored in the transfer source reload register 22.

After the transfer source address is supplied as the initial value by the CPU write and before the data transfer is finished by the number of times designated by the transfer number register 41, the selector 23 selects the transfer source address updated by the transfer source address update arithmetic device 24 for the next access. The address selected by the selector 23 is stored, as a present value, in the transfer source address register 21.

The transfer source address update arithmetic device 24 adds or subtracts the adjustment value 25 to and from the present value of the transfer source address stored in the transfer source address register 21. The arithmetic operation result is stored, as a new transfer source address, in the transfer source address register 21 through the selector 23. If a not shown CPU refers to the present transfer source address, the value stored in the transfer source address register 21 is fed to the CPU through the data bus 1.

The first difference calculation arithmetic device 51 calculates the difference between the transfer source address supplied as the initial value from the data bus 1 by the CPU write and the initial value of the transfer source address stored in the transfer source reload register 22. The difference holding register 52 stores the difference obtained by the first difference calculation arithmetic device 51.

The second difference calculation arithmetic device 53 calculates and obtains the present value of the transfer destination address from the present value of the transfer source address stored in the transfer source address register 21, using the difference stored in the difference holding register 52. The present value of the transfer destination address obtained by the second difference calculation arithmetic device 53 is supplied, as a transfer destination address, to the memory or the like of a transfer destination. It is noted that the adjustment value for the transfer source address is equal to that of the transfer destination address. If the CPU refers to the present transfer destination address, the present value of the transfer destination address obtained by the second difference calculation arithmetic device 53 is fed to the CPU through the data bus 1.

The transfer number register 41 stores the present value of the transfer number. The transfer number reload register 42 stores the initial value of the transfer number supplied from the data bus 1 by the CPU write.

If the transfer number is supplied, as an initial value, from the data bus 1 by the CPU write, the selector 43 selects the transfer number supplied by the CPU write. If data transfer is finished by the number of times designated by the transfer number register 41, the selector 43 selects the initial value of the transfer number stored in the transfer number reload register 42.

After the transfer number is supplied, as an initial value, by the CPU write and before the data transfer is finished by the number of times designated by the transfer number register 41, the selector 43 selects the transfer number updated by the transfer number update arithmetic device 44. The transfer number selected by the selector 43 is stored, as a present value, in the transfer number register 41.

The transfer number update arithmetic device 44 subtracts 1 from the present value of the transfer number stored in the transfer number register 41. The arithmetic operation result is stored, as a new transfer number, in the transfer number register 41 through the selector 43. If the CPU refers to the present transfer number, the value stored in the transfer number register 41 is fed to the CPU through the data bus 1.

The operation of the DMA controller will next be explained. A transfer source address, a transfer destination address, and a transfer number are supplied from the data bus 1 by CPU write. In the transfer source address generator 2, the transfer source address register 21 stores the supplied transfer source address as a present value, and the transfer source reload register 22 stores the same address as an initial value.

In the transfer destination address generator 5, the first difference calculation arithmetic device 51 calculates a difference between the received transfer destination address and the initial value stored in the transfer source reload register 22, and the calculated difference is stored in the difference holding register 52. The transfer number is stored in the transfer number register 41 as a present value and the same number is stored in the transfer number reload register 42 as an initial value.

A first data transfer starts when the values are stored in the transfer source address register 21, the transfer source reload register 22, the difference holding register 52, the transfer number register 41, and the transfer number reload register 42, and a start signal is received. The DMA controller outputs the value stored in the transfer source address register 21, as a transfer source address for the first data transfer, to the memory or the like that is the source of the transfer.

At this time, the second difference calculation arithmetic device 53 conducts an arithmetic operation to the transfer source address stored in the transfer source address register 21 using the value stored in the difference holding register 52 so as to obtain an original transfer destination address. The result of this arithmetic operation is output, as a transfer destination address for the first data transfer, to the memory or the like that is the destination of the transfer. As a result, data stored in a region, which corresponds to the transfer source address, of the memory or the like that is the source of the transfer, is written to a region, which corresponds to the transfer destination address, of the memory or the like that is the destination of the transfer.

If the first data transfer is finished, the transfer number update arithmetic device 44 subtracts 1 from the value stored in the transfer number register 41. The arithmetic operation result is stored, as a new transfer number, in the transfer number register 41 through the selector 43. In addition, the transfer source address update arithmetic device 24 adds or subtracts a preset adjustment value 25 to or from the value stored in the transfer source address register 21. The arithmetic operation result is stored, as a transfer source address for the second data transfer, in the transfer source address register 21, and output during the second data transfer.

On the other hand, a transfer destination address for the second data transfer is obtained by an arithmetic operation that is performed by the second difference calculation arithmetic device 53 based on the transfer source address for the second data transfer and the value stored in the difference holding register 52, and output during the second data transfer. The third data transfer and the following are performed in the same manner. If data transfer is finished when the value stored in the transfer number register 41 becomes a final transfer value, the initial value stored in the transfer source reload register 22 is written to the transfer source address register 21.

At this time, the initial value of the transfer destination address is obtained by an arithmetic operation performed by the second difference calculation arithmetic device 53 based on the initial value of the transfer source address that is written from the transfer source reload register 22 to the transfer source address register 21, and on the value stored in the difference holding register 52. Further, the initial value stored in the transfer number reload register 42 is written to the transfer number register 41. The data transfer is repeated again by performing these series of operations in response to a signal that indicates transfer start, and is stopped in response to the generation of a stop signal.

Figure 4:
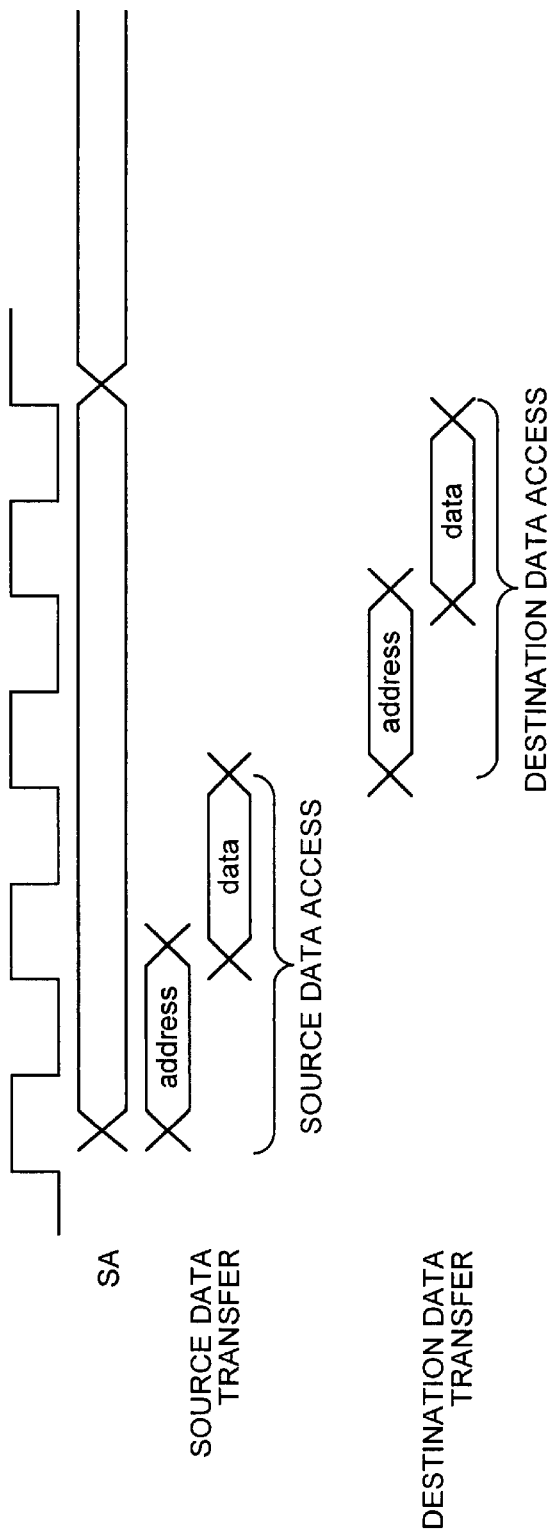
FIG. 4 is a timing chart that shows the operation timings of the DMA controller shown in FIG. 3.

FIG. 4 shows the update timing of the transfer source address register 21, and the read and write timings of transfer data in the DMA controller configured as shown in FIG. 3. As shown in FIG. 4, in the first embodiment, the value stored in the transfer source address register 21 is updated right after transfer target data is written to the memory or the like that is the destination of the transfer. Since the transfer destination address is obtained based on the value stored in the transfer source address register 21 and that of the difference holding register 52, it is unnecessary to separately provide a register that stores the present value of the transfer source address.

By way of example, a case that the adjustment value of the transfer source address is equal to that of the transfer destination address and that the number of channels from 32-bit address space is 8, will be considered. Since the transfer source address generator 2 includes the transfer source address register 21 and the transfer source reload register 22, the transfer source address generator 2 includes flip-flops of 512 bits as can be given from the following calculation equation (1). In addition, since the transfer destination address generator 5 includes the difference holding register 52, if the difference holding register 52 is 32 bits, the transfer destination address generator 5 includes flip-flops of 256 bits as can be given from the following calculation equation (2).

$$(32 \times 2) \times 8 = 512 \text{ bits} \qquad (1)$$

$$(32 \times 1) \times 8 = 256 \text{ bits} \qquad (2).$$

Figure 1:
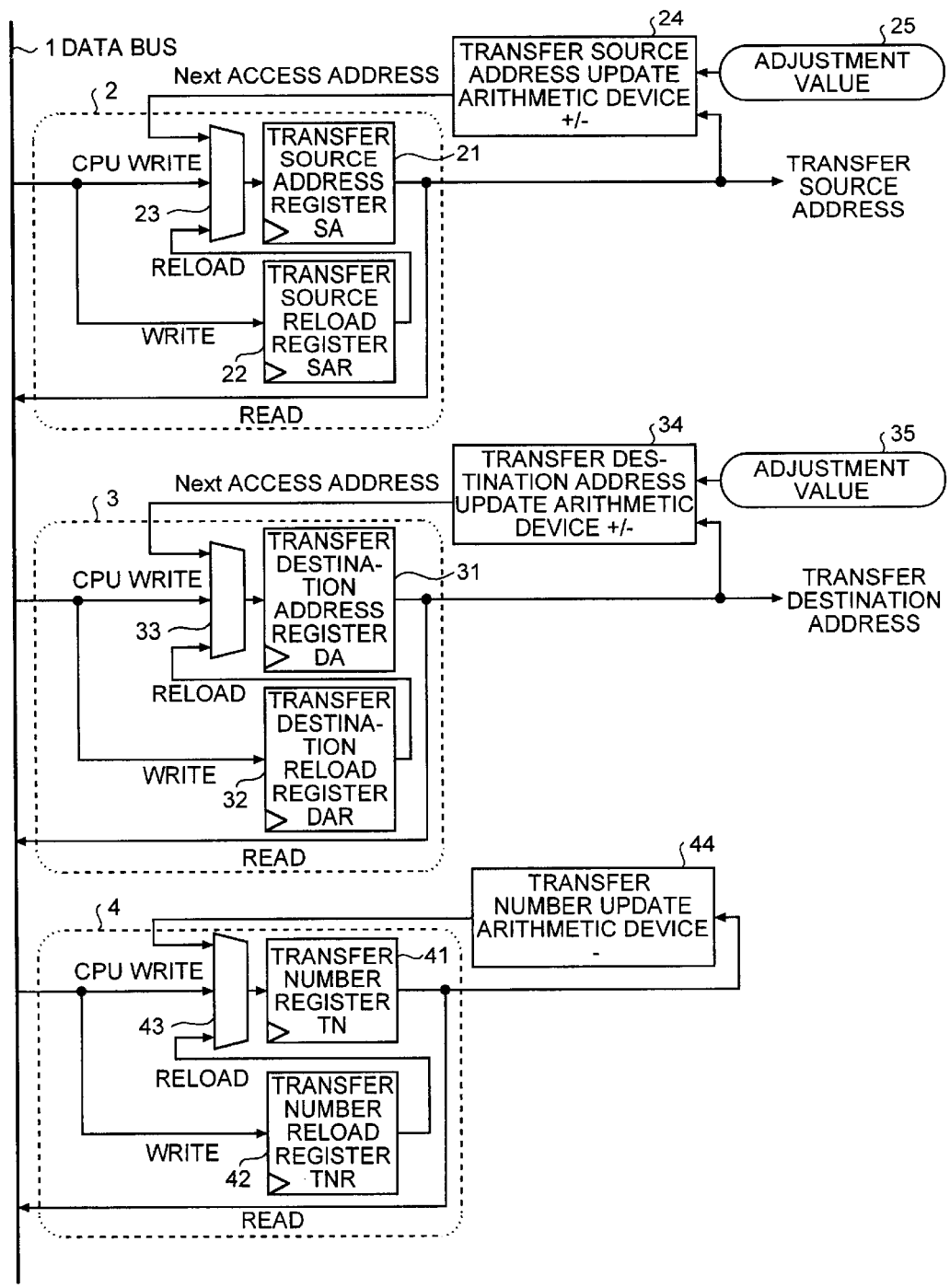
FIG. 1 is a diagram that shows the circuit configuration of a conventional DMA controller.
Figure 2:
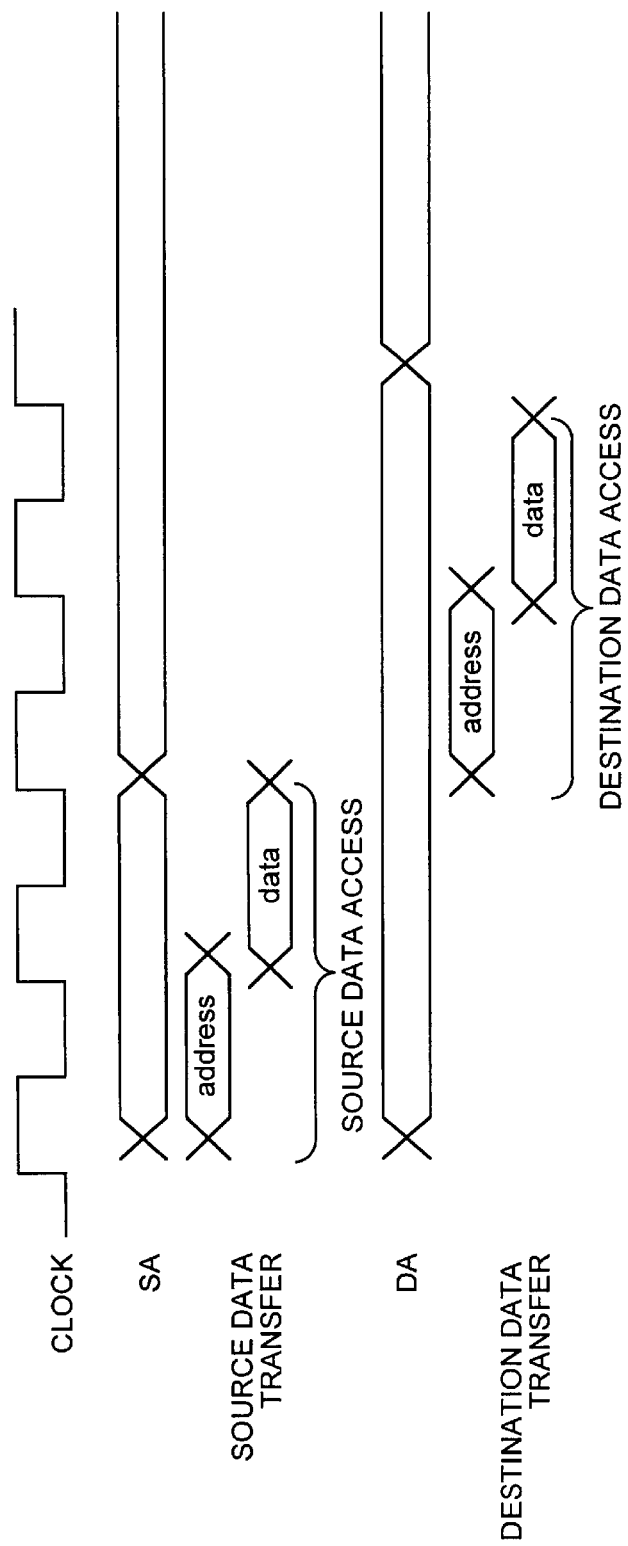
FIG. 2 is a timing chart that shows the operation timings of the DMA controller shown in FIG. 1.

In the conventional DMA controller shown in FIG. 1, by contrast, since the transfer destination address generator 3 includes the transfer destination address register 31 and the transfer destination reload register 32, the transfer destination address generator 3 also includes flip-flops of 512 bits. According to the first embodiment, therefore, it is possible to decrease the number of flip-flops by 256 bits as can be given from the following calculation equation (3), which decrease corresponds to 25% of the number of conventional flip-flops.

$$512 \text{ bits} \times 2 - (512 \text{ bits} + 256 \text{ bits}) = 256 \text{ bits} \qquad (3).$$

The difference stored in the difference holding register 52 has no change until a new transfer source address and a new transfer destination address are supplied by CPU write. Therefore, unless the value stored in the difference holding register 52 is rewritten, it is unnecessary to supply a clock to the difference holding register 52. Accordingly, no problem occurs even if the supply of the clock is stopped unless the value stored in the difference holding register 52 is rewritten. It is thereby possible to further decrease power consumption. Specifically, according to the calculation examples, the flip-flops of 256 bits, obtained by the equation (2), of the difference holding register 52 hardly operate. It is, therefore, possible to obtain the effect of decreasing power by about 50% and the effect of decreasing circuit area by 25%.

According to the first embodiment, the transfer destination address generator 5 includes the difference holding register 52 instead of the transfer destination address register and the transfer destination reload register. Therefore, the number of registers that hold addresses is decreased, compared with the conventional number of registers. The number of flip-flops that cause power consumption is decreased by the number obtained by multiplying the number of channels by the bits of the register, accordingly. Thus, it is possible to decrease the power consumption of the DMA controller.

Moreover, by decreasing the number of flip-flops, it is possible to decrease the number of clock buffers that are provided to follow the flip-flops. Since the clock buffers operate to transfer clocks, the clock buffers have high operation rate and cause power consumption. However, by decreasing the number of clock buffers, it is possible to further decrease power consumption.

Furthermore, since each of the two arithmetic devices 51 and 53 that calculate differences consists of a smaller logical circuit than the decreased flip-flops, it is possible to reduce circuit scale.

Moreover, since it is unnecessary to decrease operating frequency so as to decrease power consumption, it is possible to prevent the deterioration of the performance.

Furthermore, similarly to the conventional DMA controller, the transfer destination address and the transfer source address are output from the DMA controller to the respective memories or the like of the transfer destination and the transfer source, and the transfer destination address, the transfer source address, and the transfer number are output from the DMA controller through the data bus 1 by CPU write. Therefore, the connection relationship between the DMA controller and the exterior thereof is the same as the conventional connection, and it is unnecessary to change connection relationship. Accordingly, it is possible to easily incorporate the DMA controller in the first embodiment into an existing circuit.

Figure 5:
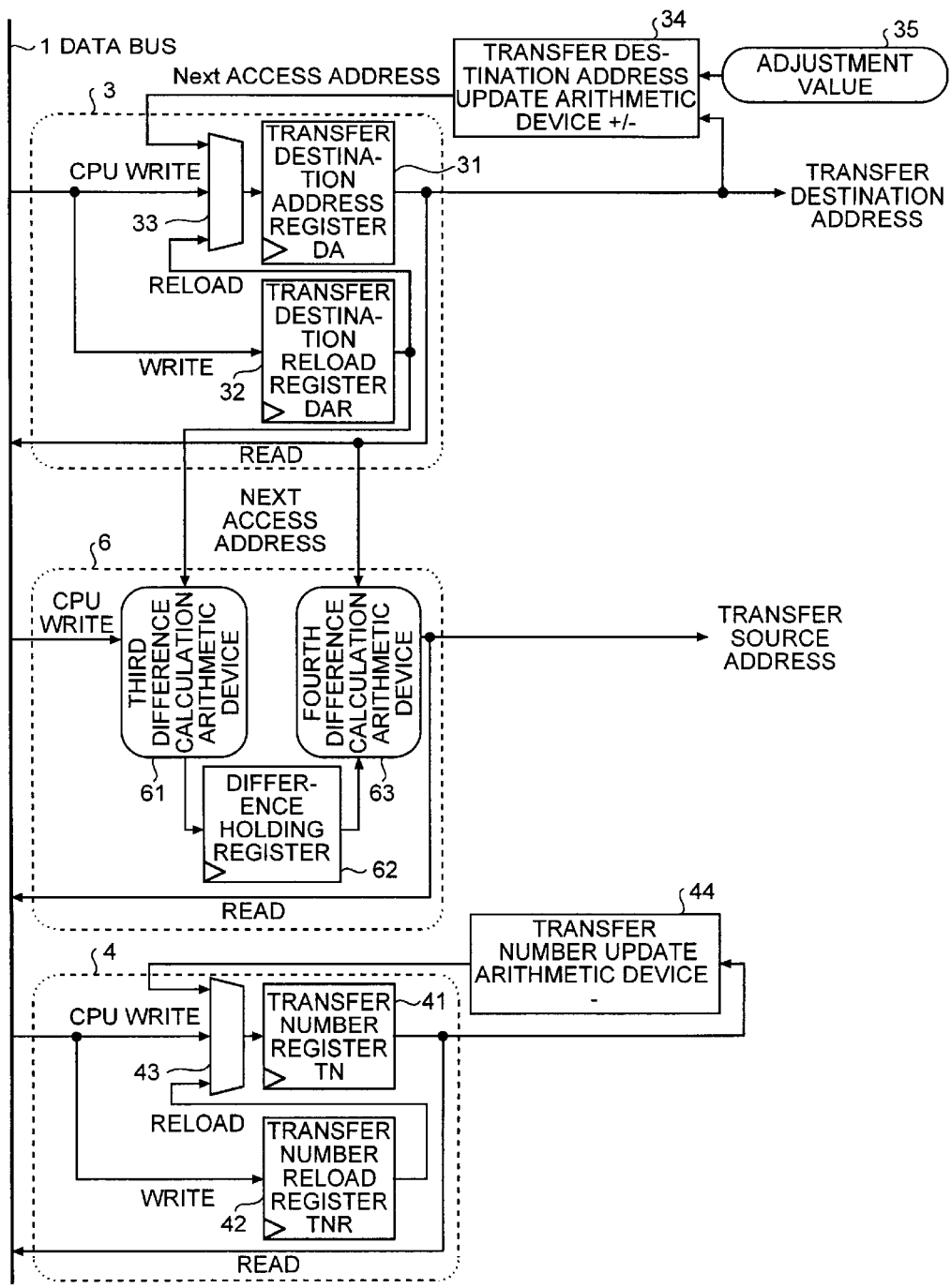
FIG. 5 is a diagram that shows the circuit configuration of a DMA controller according to the second embodiment of the present invention.

FIG. 5 is a diagram that shows the circuit configuration of a DMA controller according to the second embodiment of the present invention. This DMA controller has the transfer destination address generator 3 that includes a transfer destination address register (DA) 31, a transfer destination reload register (DAR) 32, and a selector 33. The DMA controller also has a transfer source address generator 6 that includes a third difference calculation arithmetic device 61, a difference holding register 62, and a fourth difference calculation arithmetic device 63. Since a transfer number setting section 4 and a transfer number update arithmetic device 44 are equal in configuration to those in the first embodiment, they are denoted by the same reference symbols as those in the first embodiment, respectively and will not be explained herein. The DMA controller also includes the transfer destination address update arithmetic device 34.

The transfer destination address register 31 stores the present value of a transfer destination address. The present value of the transfer destination address stored in the transfer destination address register 31 is supplied, as a transfer destination address, to the memory or the like of a transfer destination. The transfer destination reload register 32 stores the initial value of the transfer destination address supplied from a data bus 1 by CPU write.

If the transfer destination address is supplied as an initial value from the data bus 1 by CPU write, the selector 33 selects the transfer destination address supplied by the CPU write. If data transfer is finished by the number of times designated by the transfer number register 41 of the transfer number setting section 4, the selector 33 selects the initial value of the transfer destination address stored in the transfer destination reload register 32.

After the transfer destination address is supplied as the initial value by the CPU write and before the data transfer is finished by the number of times designated by the transfer number register 41, the selector 33 selects a transfer destination address updated by the transfer destination address update arithmetic device 34 for the next address. The address selected by the selector 33 is stored, as a present value, in the transfer destination address register 31.

The transfer destination address update arithmetic device 34 adds or subtracts the adjustment value 35 to or from the present value of the transfer destination address stored in the transfer destination address register 31. The arithmetic operation result is stored, as a new transfer destination address, in the transfer destination address register 31 through the selector 33. If the CPU refers to the present transfer destination address, the value stored in the transfer destination address register 31 is fed to the CPU through the data bus 1.

The third difference calculation arithmetic device 61 calculates the difference between the transfer source address supplied, as an initial value, from the data bus 1 by the CPU write and the initial value of the transfer destination address stored in the transfer destination reload register 32. The difference holding register 62 stores the difference obtained by the third difference calculation arithmetic device 61.

The fourth difference calculation arithmetic device 63 calculates and obtains the present value of the transfer source address from the present value of the transfer destination address stored in the transfer destination address register 31, using the difference stored in the difference holding register 62. The present value of the transfer source address that is calculated by the fourth difference calculation arithmetic device 63 is supplied, as a transfer source address, to the memory or the like that is the source of the transfer. It is noted that the adjustment value of the transfer destination address is equal to that of the transfer source address. If the CPU refers to the present transfer source address, the present value of the transfer source address obtained by the fourth difference calculation arithmetic device 63 is fed to the CPU through the data bus 1.

The operation of the DMA controller according to the second embodiment will next be explained. A transfer destination address, a transfer source address, and a transfer number are first supplied from the data bus 1 by CPU write. In the transfer destination address generator 3, the supplied transfer destination address is stored in the transfer destination address register 31 as a present value, and stored in the transfer destination reload register 32 as an initial value.

On the other hand, in the transfer source address generator 6, the difference between the supplied transfer source address and the initial value of the transfer destination address stored in the transfer destination reload register 32 is obtained by the third difference calculation arithmetic device 61 based on the supplied transfer source address and on the initial value of the transfer destination address, and is stored in the difference holding register 62. The transfer number is stored in the transfer number register 41 as a present value, and stored in the transfer number reload register 42 as an initial value in the transfer number setting section 4.

If the values are stored in the transfer destination address register 31, the transfer destination reload register 32, the difference holding register 62, the transfer number register 41, and the transfer number reload register 42, respectively, and a start signal is received, first data transfer starts. The DMA controller outputs, as a transfer destination address for the first data transfer, the value stored in the transfer destination address register 31 to the memory or the like of a transfer destination.

The fourth difference calculation arithmetic device 63 obtains a transfer source address based on the transfer destination address stored in the transfer destination address register 31 and on the value stored in the difference holding register 62, and outputs the obtained transfer source address to the memory or the like of a transfer source as a transfer source address for the first data transfer. As a result, data stored in a region, which corresponds to the transfer source address, of the memory or the like that is the source of the transfer is written to a region, which corresponds to the transfer destination address, of the memory or the like that is the destination of the transfer.

If the first data transfer is finished, the transfer number update arithmetic device 44 subtracts 1 from the value stored in the transfer number register 41, and the subtracted value is stored via the selector 43 of the transfer number setting section 4, as a new transfer number, in the transfer number register 41. In addition, the transfer destination address update arithmetic device 34 adds or subtracts the preset adjustment value 35 to or from the value stored in the transfer destination address register 31. The arithmetic operation result is stored, as a transfer destination address for the second data transfer, in the transfer destination address register 31, and output during the second data transfer.

On the other hand, a transfer source address for the second data transfer is obtained by the fourth difference calculation arithmetic device 63 based on the transfer destination address for the second data transfer and the value stored in the difference holding register 62, and output during the second data transfer. The third data transfer and the following are performed in the same manner. If the data transfer is finished when the value stored in the transfer number register 41 becomes equal to a final transfer value, the initial value stored in the transfer destination reload register 32 is written to the transfer destination address register 31.

The initial value of the transfer source address is obtained by the fourth difference calculation arithmetic device 63 based on the initial value of the transfer destination address written to the transfer destination address register 31 from the transfer destination reload register 32, and on the value stored in the difference holding register 62. In addition, the initial value stored in the transfer number reload register 42 is written to the transfer number register 41. The data transfer is repeated again by performing these series of operations in response to a transfer start signal, and is stopped in response to the generation of a stop signal.

FIG. 6 shows the update timing of the transfer destination address register 31 and the read and write timings of transfer data in the DMA controller. As shown in FIG. 6, in the second embodiment, the value stored in the transfer destination address register 31 is updated right after the transfer target data is written to the memory or the like that is the destination of the transfer.

According to the second embodiment, similarly to the first embodiment, the number of registers that hold addresses decreases, compared with the conventional number. The number of flip-flops decreases by the number obtained by multiplying the number of channels by the number of bits of registers, accordingly. It is, therefore, possible to decrease the power consumption of the DMA controller, and to reduce the circuit scale of the DMA controller without deteriorating the performance thereof.

Furthermore, it is not necessary to change the connection relationship between the DMA controller and the exterior thereof. It is, therefore, possible to easily incorporate the DMA controller in the second embodiment into an existing circuit.

The present invention is not limited to the embodiments explained so far, but various changes and modifications can be made to the present invention. For example, since the number of bits of the difference holding register is determined according to the size of address space, it is possible to decrease the number of bits of the difference holding register if the address space is small.

According to the present invention, the number of registers that hold addresses decreases from the conventional number and the number of flip-flops decreases by the number obtained by multiplying the number of channels by the number of bits of registers, accordingly. It is, therefore, possible to decrease the power consumption of the DMA controller and to reduce the circuit scale of the DMA controller without deteriorating the performance thereof. Further, according to the present invention, it is unnecessary to change the connection relationship between the DMA controller and the exterior thereof. It is, therefore, possible to easily incorporate the DMA controller into an existing circuit.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A direct memory access controller, in which an additive value or a subtractive value of a transfer destination address is equal to an additive value or a subtractive value of a transfer source address, comprising:

a transfer source address storing unit that stores a present value of the transfer source address;

a transfer source reload storing unit that stores an initial value of the transfer source address;

a first difference calculating unit that obtains a difference between the initial value of the transfer source address and an initial value of the transfer destination address;

a difference storing unit that stores the difference obtained by the first difference calculating unit; and a second difference calculating unit that calculates a present value of the transfer destination address based on the difference stored in the difference storing unit and the present value of the transfer source address stored in the transfer source address storing unit.

2. The direct memory access controller according to claim 1, wherein
   the first difference calculating unit receives the initial value of the transfer source address from the transfer source reload storing unit.

3. The direct memory access controller according to claim 1, wherein
   the present value of the transfer source address stored in the transfer source address storing unit is updated according to the additive value or the subtractive value right after data read from a transfer source is written to a transfer destination based on the present value of the transfer source address.

4. The direct memory access controller according to claim 1, wherein
   the present value of the transfer source address stored in the transfer source address storing unit is rewritten to the initial value of the transfer source address stored in the transfer source reload storing unit when data transfer is finished by a designated number of times.

5. The direct memory access controller according to claim 4, wherein
   if the present value of the transfer source address stored in the transfer source address storing unit is rewritten to the initial value of the transfer source address stored in the transfer source reload storing unit, the second difference calculating unit obtains the initial value of the transfer destination address based on the rewritten present value of the transfer source address, and on the difference stored in the difference storing unit.

6. The direct memory access controller according to claim 1, wherein
   a clock is supplied to the difference storing unit only when the difference newly obtained by the first difference calculating unit is stored.

7. A direct memory access controller, in which an additive value or a subtractive value of a transfer destination address is equal to an additive value or a subtractive value of a transfer source address, comprising:

a transfer destination address storing unit that stores a present value of the transfer destination address;

a transfer destination reload storing unit that stores an initial value of the transfer destination address;

a first difference calculating unit that obtains a difference between the initial value of the transfer destination address and an initial value of the transfer source address;

a difference storing unit that stores the difference obtained by the first difference calculating unit; and a second difference calculating unit that calculates a present value of the transfer source address based on the difference stored in the difference storing unit and the present value of the transfer destination address stored in the transfer destination address storing unit.

8. The direct memory access controller according to claim 7, wherein
   the initial value of the transfer destination address is supplied to the first difference calculating unit from the transfer destination reload storing unit.

9. The direct memory access controller according to claim 7, wherein
   the present value of the transfer destination address stored in the transfer destination address storing unit is updated according to the additive value or the subtractive value right after data read from a transfer source is written to a region, which corresponds to the present value of the transfer destination address.

10. The direct memory access controller according to claim 7, wherein
    the present value of the transfer destination address stored in the transfer destination address storing unit is rewritten to the initial value of the transfer destination address stored in the transfer destination reload storing unit when data transfer is finished by a designated number of times.

11. The direct memory access controller according to claim 10, wherein
    if the present value of the transfer destination address stored in the transfer destination address storing unit is rewritten to the initial value of the transfer destination address stored in the transfer destination reload storing unit, the second difference calculating unit obtains the initial value of the transfer source address based on the rewritten present value of the transfer destination address, and on the difference stored in the difference storing unit.

12. The direct memory access controller according to claim 7, wherein
    a clock is supplied to the difference storing unit only when the difference newly obtained by the first difference calculating unit is stored.

* * * * *